(12) United States Patent
Eto

(10) Patent No.: US 9,315,361 B2
(45) Date of Patent: Apr. 19, 2016

(54) GROUP SUPERVISORY CONTROL DEVICE FOR ELEVATOR

(75) Inventor: Masaharu Eto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 483 days.

(21) Appl. No.: 13/979,426

(22) PCT Filed: Feb. 3, 2011

(86) PCT No.: PCT/JP2011/000593
§ 371 (c)(1),
(2), (4) Date: Jul. 12, 2013

(87) PCT Pub. No.: WO2012/104917
PCT Pub. Date: Aug. 9, 2012

(65) Prior Publication Data
US 2013/0284542 A1 Oct. 31, 2013

(51) Int. Cl.
*B66B 1/18* (2006.01)
*B66B 1/34* (2006.01)
*B66B 1/24* (2006.01)

(52) U.S. Cl.
CPC .............. *B66B 1/34* (2013.01); *B66B 1/2458* (2013.01); *B66B 2201/101* (2013.01); *B66B 2201/216* (2013.01); *Y02B 50/122* (2013.01)

(58) Field of Classification Search
CPC .. B66B 1/34; B66B 1/2458; B66B 2201/101; B66B 2201/216; Y02B 50/122
USPC ......... 187/247, 289, 290, 316, 380–389, 391, 187/393
See application file for complete search history.

(56) References Cited

U.S. PATENT DOCUMENTS 3,589,473 A * 6/1971 Kirsch ................... B66B 1/18
187/387
5,780,789 A * 7/1998 Tsuji ................... B66B 1/2458
187/380

(Continued)

FOREIGN PATENT DOCUMENTS

JP 57 90368 6/1982
JP 4 191251 7/1992

(Continued)

OTHER PUBLICATIONS

International Search Report Issued May 24, 2011 in PCT/JP11/000593 Filed Feb. 3, 2011.

*Primary Examiner* — Anthony Salata
(74) *Attorney, Agent, or Firm* — Oblon, McClelland, Maier & Neustadt, L.L.P.

(57) ABSTRACT

A group supervisory control device for an elevator includes a hall call assignment portion assigning a specific car to a hall call registered; an operation prediction portion predicting which is the operation to the next hall registered, regenerative operation or power running operation, and the time for which the regenerating operation or the power running operation is performed when the specific car has stopped at a responding hall; and a door open time control portion comparing the time for which the regenerative operation or the power running operation of the specific car is performed with the remaining running time of any other car performing the power running operation or the regenerative operation already predicted, calculating overlap time for the operations simultaneously, and making door open time set for the specific car changed to determine the door open time that can obtain longer overlap time, whereby a door is closed.

6 Claims, 4 Drawing Sheets

(56) References Cited

U.S. PATENT DOCUMENTS

| | | | | |
|---|---|---|---|---|
| 6,672,431 B2* | 1/2004 | Brand | B66B 1/2458 | 187/247 |
| 6,827,182 B2* | 12/2004 | Araki | B66B 5/027 | 187/290 |
| 7,416,057 B2* | 8/2008 | Kostka | B66B 1/18 | 187/382 |
| 7,743,890 B2* | 6/2010 | Nikovski | B66B 1/2458 | 187/247 |
| 7,909,143 B2* | 3/2011 | Tyni | B66B 1/2458 | 187/247 |
| 8,997,940 B2* | 4/2015 | Villa | B66B 1/2408 | 187/388 |
| 9,016,440 B2* | 4/2015 | Finschi | B66B 1/2458 | 187/382 |
| 9,079,752 B2* | 7/2015 | Takeshima | B66B 1/2458 | |
| 9,212,030 B2* | 12/2015 | Finschi | B66B 25/00 | |
| 2013/0048436 A1* | 2/2013 | Chan | B66B 1/2408 | 187/387 |
| 2013/0228399 A1* | 9/2013 | Eto | B66B 1/2458 | 187/382 |

FOREIGN PATENT DOCUMENTS

| | | |
|---|---|---|
| JP | 9 227033 | 9/1997 |
| JP | 2005 6476 | 1/2005 |
| JP | 2009 220906 | 10/2009 |
| JP | 2010 64864 | 3/2010 |

\* cited by examiner

GROUP SUPERVISORY CONTROL DEVICE FOR ELEVATOR

TECHNICAL FIELD

The present invention relates to a group supervisory control device for an elevator, by which elevator devices for controlling a plurality of elevator cars are controlled as one group, which group supervisory control device utilizes regenerative power at the time of elevator operation.

BACKGROUND ART

In a general elevator system, an elevator car and a counterweight are connected to each other by a rope, and the counterweight has a weight that is balanced with the weight of elevator car on which a half of rated number of passengers are onboard. Therefore, when an empty car runs upward, the position energy of counterweight turns a traction machine, so that the traction machine works as a generator, enabling electric power to be regenerated. Inversely, when the empty car runs downward, the traction machine performs power running operation, consuming electric power.

In some conventional elevator control devices, in a plurality of elevator devices connected to a common power supply device, consumed power and regenerative power are monitored, and any car is operated upward or downward so that the total consumed power and the total regenerative power become substantially equal to each other (for example, refer to Patent Literature 1).

Also, in some conventional elevator control devices, elevator cars are divided into a regenerative operation group and a power running operation group, and when the difference in evaluation values of hall calls is within the fixed reference, a hall call is assigned to a car of the regenerative operation group (for example, refer to Patent Literature 2).

CITATION LIST

Patent Literature

Patent Literature 1: Japanese Unexamined Patent Application Publication No. 2010-64864 (page 9, paragraphs 0057 to 0061, FIG. 2)

Patent Literature 2: Japanese Unexamined Patent Application Publication No. 2009-220906 (page 7, paragraphs 0039 and 0043, FIG. 4)

SUMMARY OF INVENTION

Technical Problem

Unfortunately, in the above-described conventional elevator control devices, to make the total consumed power and the total regenerative power substantially equal to each other, a not-called car is run. Therefore, considering the conversion loss of position energy of counterweight in the actual elevator device, it cannot necessarily be said that energy saving operation is performed with high efficiency. Also, when a hall call is assigned preferentially to a car of the regenerative operation, since the regenerative power is not positively utilized for the operation of other cars, there arises a problem that the regenerative power becomes wasteful.

The present invention has been made to solve the above problem, and accordingly an object thereof is to provide a group supervisory control device for an elevator, by which the time for which the regenerative operation and the power running operation are overlapped with each other can be prolonged, and energy saving operation can be performed with high efficiency by consuming the regenerative power in the power running operation.

Means for Solving the Problems

An elevator devices of the present invention is a group supervisory control device for an elevator, by which elevator control devices for controlling a plurality of cars are controlled as one group, including: hall call assignment means by which a specific car is assigned to a hall call registered at each floor; operation prediction means by which, when the specific car has stopped at a responding hall, it is predicted which is the operation to the next hall registered by the hall call registration means according to the car traveling direction and the car load, regenerative operation which regenerates power or power running operation which consumes power, and the time for which the regenerating operation or the power running operation is performed is predicted; and door open time control means by which the time for which the regenerative operation or the power running operation of the specific car is performed, which is predicted by the operation prediction means, is compared with the remaining running time of any other car performing the power running operation or the regenerative operation already predicted by the operation prediction means, overlap time for which the specific car and the any other car perform the regenerative operation and the power running operation simultaneously is calculated, and door open time set for the specific car, which is used for the calculation, is changed and the overlap time is calculated to determine the door open time which can obtain longer overlap time, whereby a door is closed.

Advantageous Effect of Invention

According to the group supervisory control device for an elevator in accordance with the present invention, the time for which the regenerative operation and the power running operation are overlapped with each other can be prolonged by controlling the door open time of elevator car, and energy saving operation can be performed with high efficiency by consuming the regenerative power simultaneously in the power running operation.

DESCRIPTION OF EMBODIMENTS

First Embodiment

Embodiments for carrying out the present invention will now be described with reference to the accompanying drawings.

Explanation is given of a group supervisory control device for an elevator in accordance with a first embodiment.

Figure 1:
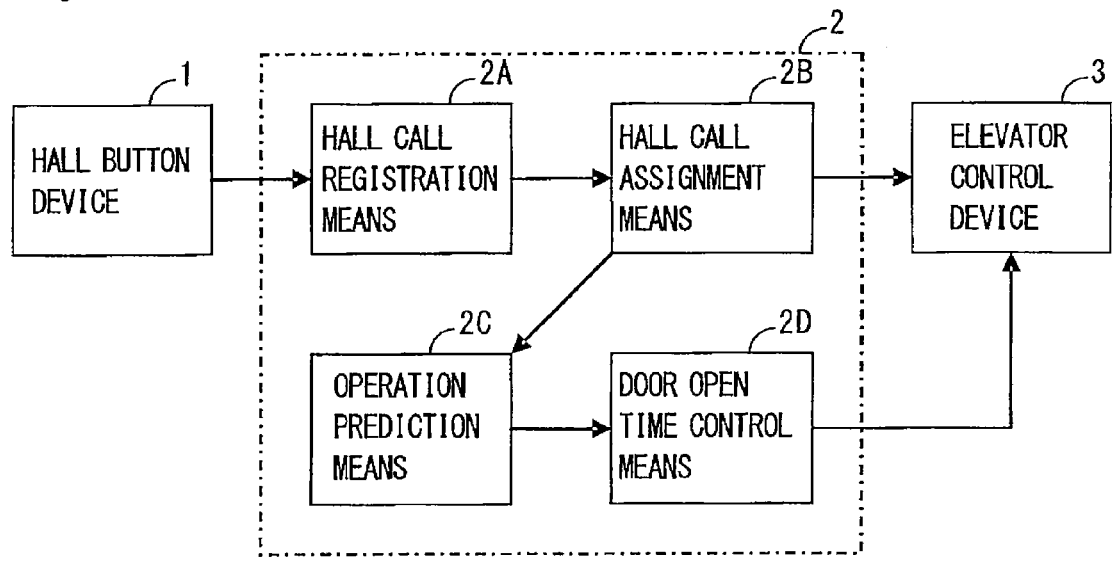
FIG. 1 is a block diagram showing a configuration of the group supervisory control device for an elevator in accordance with the first embodiment of the present invention.

FIG. 1 is a block diagram showing a configuration of the group supervisory control device for an elevator in accordance with the first embodiment of the present invention. In FIG. 1, reference sign 1 denotes a hall button device provided in a hall of each floor of a building. Reference sign 2 denotes a group supervisory control device for an elevator for controlling a plurality of elevators based on an input to the hall button device 1, the group supervisory control device having the means described below. Reference sign 3 denotes an elevator control device for controlling cars upon instructions of the group supervisory control device 2.

The group supervisory control device 2 for an elevator is composed of a hall call registration means 2A, a hall call assignment means 2B, an operation prediction means 2C, and a door open time control means 2D. The hall call registration means 2A registers a hall call based on the input from the hall button device 1, and the hall call assignment means 2B assigns a hall call registered by the hall call registration means 2A to the optimum car. Also, the operation prediction means 2C predicts the amount of regenerative power or the amount of consumed power for the next running of each car from, for example, the position of car, the onboard load of car, the position of next call, and the like, and predicts regenerative operation or power running operation. Also, the operation prediction means 2C also predicts the next running time of each car. In the case where the hall call registration means 2A has no registration, and a reference floor (for example, the first floor) has been set, the reference floor may be set as the next hall. Also, the door open time control means 2D determines, for a car 4A arriving in response to a hall call or a car call, whether or not any other car whose amount of consumed/regenerative power is canceled each other by the amount of consumed/regenerative power of the car 4A within fixed time exists. In this case, "being canceled each other" means to reduce the consumption of power, and means that, for example, 50% of the amount of consumed power of 100% is canceled by the amount of regenerative power. The canceling of not more than 10% of amount of consumed power need not be adopted. Also, in the case where any other car whose amount of regenerative/consumed power is canceled each other by that of the car 4A has arrived at a certain hall or is running, from the result of the operation prediction means 2C, the door open time of, for example, the car 4A by which power is regenerated by regenerative operation and any other car by which power is consumed by power running operation is determined so that the time for which the regenerative operation and the power running operation are overlapped with each other is at the maximum, and the door close of the car 4A or any other car is controlled. In this case, the "door open time" means the time from when a door has been opened fully to when the door begins to be closed.

Figure 2:
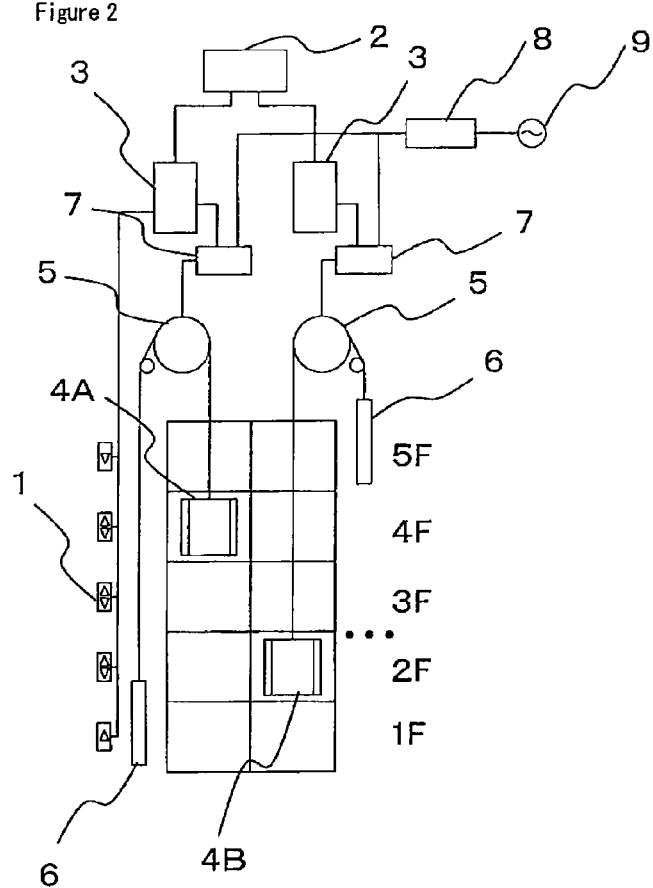
FIG. 2 is a configuration view of an elevator system configuring the group supervisory control device for an elevator in accordance with the first embodiment of the present invention.

FIG. 2 is a configuration view of an elevator system in accordance with the first embodiment of the present invention. In FIG. 2, reference sign 1 denotes the hall button device installed in a hall. The hall button device is connected to the elevator control device 3, and the information of hall button is transmitted to the group supervisory control device 2 for an elevator through the elevator control device 3. Also, reference sign 3 denotes the elevator control device for controlling each car. Cars 4A and 4B are elevator cars that move up and down in a shaft. The car 4A is a car assigned by a hall call, and the car 4B is one of cars existing in plural number, being any other car. Reference sign 5 denotes a traction machine for moving up and down the cars 4A or 4B.

Reference sign 6 denotes a counterweight that moves in the direction opposite to that of the car 4A, 4B. The counterweight 6 is connected to the elevator car 4A, 4B by a main rope, and has a weight that is balanced with the weight of elevator car 4A, 4B on which a half of rated number of passengers are onboard. That is, when less than a half of rated number of passengers get in the car 4A, 4B, since the car 4A, 4B is lighter than the counterweight 6, the car 4A, 4B is going to move upward. However, when the car 4A, 4B is moved downward against the upward movement by the driving force of a motor of the traction machine 5, the power running operation is performed. Also, when more than a half of rated number of passengers get in the car 4A, 4B, since the car 4A, 4B is heavier than the counterweight 6, the car 4A, 4B is going to move downward. However, also when the car 4A, 4B is moved upward against the downward movement by the driving force of the motor, the power running operation is performed.

On the other hand, when less than a half of rated number of passengers get in the car 4A, 4B, the car 4A, 4B is going to move upward. However, when the car 4A, 4B is moved upward following the upward direction by operating the motor of the traction machine 5 as a generator, the generative operation is performed. Also, when more than a half of rated number of passengers get in the car 4A, 4B, the car 4A, 4B is going to move downward. However, also when the car 4A, 4B is moved downward following the downward direction by operating the motor of the traction machine 5 as a generator, the generative operation is performed. That is, which is the car operation, the generative operation or the power running operation, is determined by the car load and the car movement direction. The regenerative power obtained by the generative operation can be consumed by the power running operation.

Also, reference sign 7 denotes an inverter for driving the traction machine 5. Reference sign 8 denotes a converter for converting an ac power into dc power, and 9 denotes a commercial power source.

Figure 3:
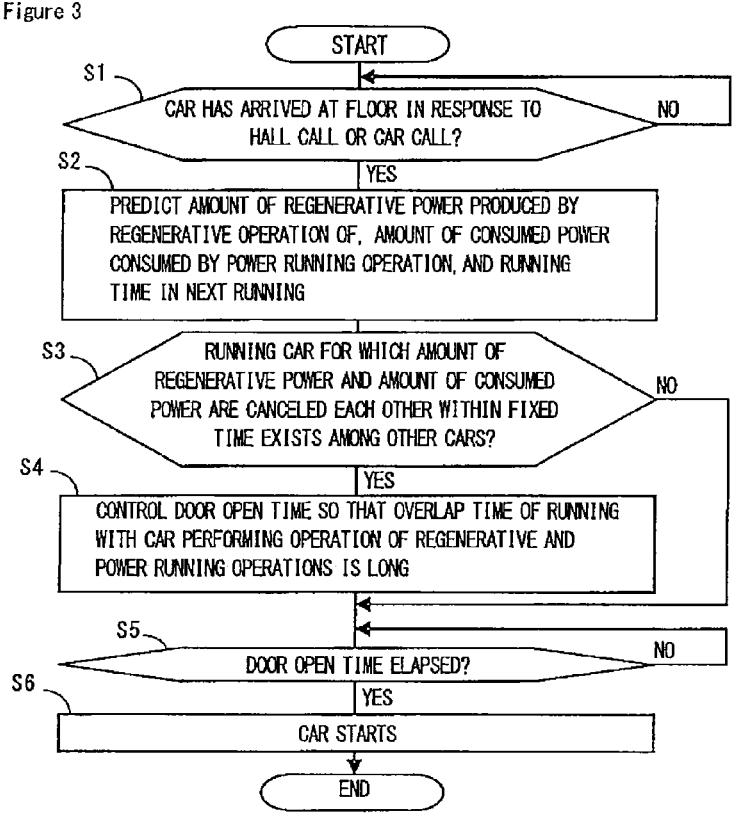
FIG. 3 is a flowchart showing motion of the group supervisory control device for an elevator in accordance with the first embodiment of the present invention.

Next, the motion of the group supervisory control device for an elevator in accordance with the first embodiment of the present invention is explained with reference to the flowchart of FIG. 3. First, in Step S1, the hall call assignment means 2B determines whether or not the car 4A assigned by the hall call assignment means 2B has arrived at a floor responding to a hall call performed in a hall or a floor responding to a car call performed in a car. If it is determined that the car 4A has arrived, the process proceeds to Step S2, and if it is determined that the car 4A has not arrived, the process returns to Step S1.

In Step S2, the operation prediction means 2C predicts the amount of regenerative power or the amount of consumed power for the next running of car from the position of car, the load of car, the position of next call, and the like, and predicts regenerative operation or power running operation. Also, the operation prediction means 2C predicts the running time for the next running, and the process proceeds to Step S3. The prediction of the amount of regenerative power or the amount of consumed power is accomplished for all cars including the cars 4A and 4B, and the prediction for each car is accomplished repeatedly, for example, during the time from when the passenger gets into the car to when the door begins to be closed.

In Step S3, referring to the information of running time of any other car (a plurality of cars and stopping cars are allowed if predicted already) whose regenerative/power running operation is reverse to that of the car 4A, which is stored by the operation prediction means 2C at the time point at which prediction is accomplished by the operation prediction means 2C, the door open time control means 2D determines whether or not a running car for which the amount of regenerative power and the amount of consumed power are canceled each other within fixed time exists among other cars. The running time of any other car is detected by the timer function of the operation prediction means 2C. At this time, the fixed time is made, for example, four seconds, and the total time including the time for extending the door open time, explained later, is made, for example, fifteen seconds, which is the time for which the passenger can allow to wait for energy saving. At this time, the information of running time of the referred other car is information of time taken for the next running in the case where the car is stopping, and is information of remaining time of the running time in the case where the car is running. The prediction of the amount of regenerative power produced by the regenerative operation and the amount of consumed power consumed by the power running operation at the next running time of the car 4A and any other car is accomplished repeatedly by the operation prediction means 2C for each car, for example, when the car has arrived at the hall and during the time from when the passenger gets into the car to when the door begins to be closed. The prediction may be accomplished at the time when a car call arrives, at the time when a hall call arrives, or at the time when the door closing is started, and also the prediction may be accomplished repeatedly always during stopping.

Also, even in the case where three or more running cars, including the car 4A, for which the amount of regenerative power and the amount of consumed power are canceled each other exist, the door open time control means 2D determines whether or not the total amount of regenerative power and the total amount of consumed power are canceled each other. If the running car for which the amount of regenerative power and the amount of consumed power are canceled each other with respect to the car 4A, for example, the car 4B exists, the process proceeds to Step S4. If such a car does not exist, the process proceeds to Step S5.

In Step S4, the time for which the next running time of the car 4A arriving at a hall overlaps with the running time of the car 4B, which is determined to be a car that is reverse to the car 4A in regenerative/power running operation, is calculated by an arithmetic operation means (not shown) provided in the door open time control means 2D. The time that is the maximum overlap time among the times calculated by adding or subtracting a plurality of set numbers of seconds (for example, ±t1, ±t2, ±t3) to or from the standard door open time is calculated while being compared by the arithmetic operation means provided in the door open time control means 2D. Further, the door open time of the car 4A or the car 4B is controlled by the door open time obtained by adding the number of seconds determined to be the maximum overlap time by the calculation among the set numbers of seconds. At this time, when the number of seconds for which the maximum overlap time is obtained exists in plural numbers among the plurality of set numbers of second, the number of seconds in which the door open time from when the door has been opened fully to when the door begins to be closed is shorter may be adopted.

Also, the configuration may be such that when the remaining running time of the car 4B is not shorter than the predetermined setting time, the arithmetic operation means provided in the door open time control means 2D calculates the overlap time between the running times of the car 4A and the car 4B. Thereby, the processing load of the door open time control means 2D can be reduced.

For example, in the case where the car 4A has arrived at 3F in response to a hall call, and any other car 4B has arrived at 4F in response to a hall call or a car call, and where the operation prediction means 2C predicts that the car 4A performs regenerative operation for eight seconds after two seconds, and the car 4B performs power running operation for ten seconds after five seconds, the running times overlap for five seconds. However, if the door open time control means 2D carries out control such that the door open time of the car 4A is extended by three seconds, and the door open times of the car 4A and the car 4B are equal to each other, the running times overlap for eight seconds.

However, in the case where the car 4A has arrived at 3F in response to a hall call, and any other car 4B has arrived at 4F in response to a hall call or a car call, and where the operation prediction means 2C predicts that the car 4A performs regenerative operation for ten seconds after two seconds, and the car 4B performs power running operation for eight seconds after five seconds, the overlap time between running times becomes the maximum of eight seconds merely by delaying the door open time of the car 4A by one second without carrying out the control such that the door open time of the car 4A is extended by three seconds, and the door open times of the car 4A and the car 4B are equal to each other.

Also, the case where the car 4B is running is also thought. For example, the case is such that the car 4A has arrived at 3F in response to a hall call, and the car 4B, which is one of other cars, is running in a portion near 4F. In this case, to maximize the overlap of the running times of the car 4A and the car 4B, control is carried out so that the door close is begun so that the door open time control means 2D makes the door open time of the car 4A having arrived at the hall shorter than the door open time of the car 4A at the normal time.

Also, the case where three or more cars that cancel the amounts of regenerative power and consumed power each other exist is also thought. For example, the case is such that the car 4A has arrived at 5F in response to a hall call, the car 4B has arrived at 9F and a car 4C has arrived at 3F in response to a hall call or a car call, and it is assumed that the operation prediction means 2C predicts that the car 4A performs regenerative operation for ten seconds after two seconds, the car 4B performs power running operation for five seconds after five seconds, and the car 4C performs power running operation for eight seconds after eight seconds. In this case, the overlap time between the regenerative operation and the power running operation is seven seconds. However, by extending the door open time of the car 4A by three seconds and matching it with the door open time of the car 4B, the overlap time between the regenerative operation and the power running operation can be made the maximum of ten seconds.

From the above-described example, in the case where within fixed time from when the car 4A arrives at the hall, any other car 4B arrives at a certain hall, at the time point when the amount of regenerative power produced by the generative operation of the car 4A or the amount of consumed power consumed by the power running operation thereof are predicted, the running time of the already predicted amount of consumed power consumed by the power running operation or amount of regenerative power produced by the generative operation is compared with the overlap time, and the door open time control means 2D carries out control such that the door open time of the car 4A or the car 4B is extended so that the overlap between the running times of the car 4A and the car 4B is at the maximum.

Also in the case where the car 4B performing the power running operation that is reverse to the regenerative operation in the next running of the car 4A is running, control is carried out so that the overlap between the running times of the car 4A and the car 4B is at the maximum. At this time, the control is carried out so that the door open time of the car 4A at the time when the car 4B is running is shorter than the door open time of the car 4A at the normal time, that is, the standard time. When the door begins to be closed, the process proceeds to the next Step S5.

In Step S5, the door open time control means 2D determines whether or not the door open time has elapsed. If the door open time has elapsed, the process proceeds to Step S6. In Step S6, the car starts and runs to the next call.

In the above-described embodiment, to increase the effect of control of door open time, the door close button in the elevator car may be made invalid temporarily.

Also, in the above-described example, explanation has been given of the process in which the overlap time of cars that cancel the regenerative operation and the power running operation each other is lengthened even a little. However, it is a matter of course that the process may be such that the amount of power is determined, door open time for which the amount of power canceling each other is large is adopted, and the door is closed in accordance with that door open time.

As described above, according to the first embodiment of the present invention, the time that is the maximum overlap time among the times calculated by adding or subtracting a plurality of set numbers of seconds to or from the overlap time between the next running time of the car 4A having arrived at the hall and the remaining time of the running time of the car 4B, which is determined to be a car that is reverse to the car 4A in regenerative/power running operation within fixed time is compared and calculated by the arithmetic operation means provided in the door open time control means 2D, and the door open time of the car 4A or the car 4B is controlled by the door open time to which the number of seconds determined to be the maximum overlap time by calculation among the set numbers of seconds is added. Therefore, the decrease in operation efficiency is suppressed to the minimum, and the regenerative power can be consumed more by the power of the power running operated car, whereby energy saving operation can be performed with high efficiency.

Also, since the regenerative power can be consumed more by the power of the power running operated car, a secondary battery for temporarily storing the regenerative power is not needed, or the capacity of the secondary battery can be decreased, which results in a reduction in the cost.

Second Embodiment

Explanation is given of a group supervisory control device for an elevator in accordance with a second embodiment of the present invention. The explanation of the configuration and motion that are the same as those of the first embodiment is omitted as appropriate.

Figure 4:
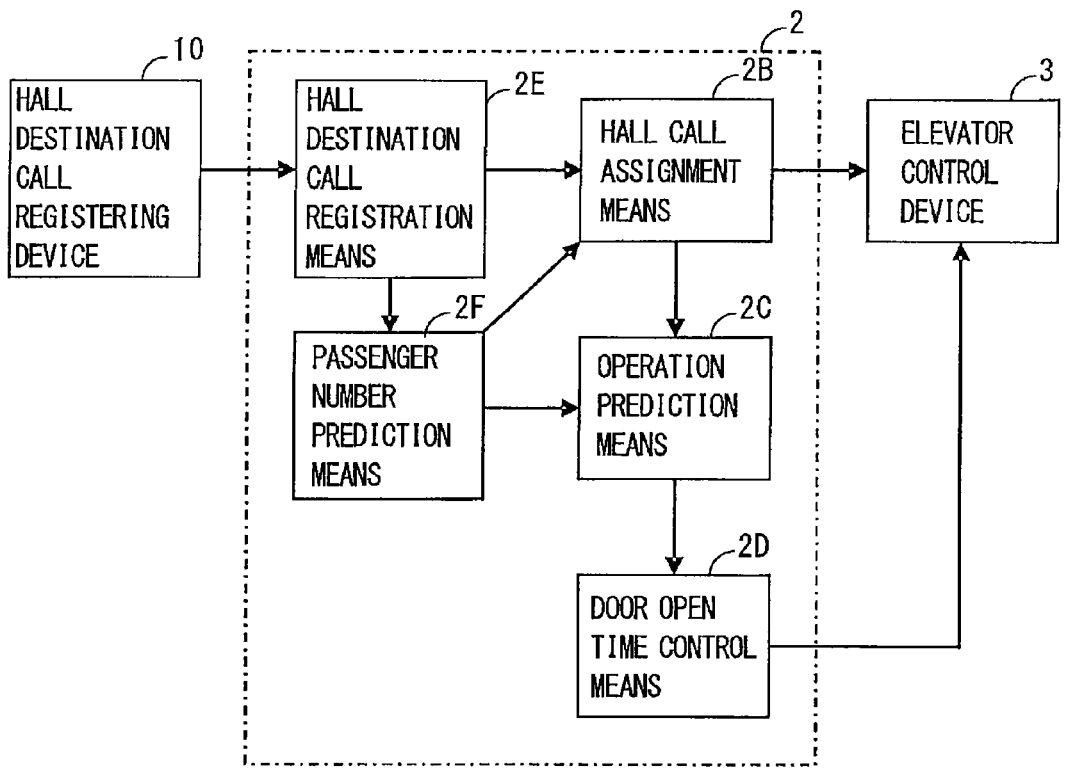
FIG. 4 is a block diagram showing a configuration of the group supervisory control device for an elevator in accordance with the second embodiment of the present invention.

FIG. 4 is a block diagram showing a configuration of the group supervisory control device for an elevator in accordance with the second embodiment of the present invention. The explanation of the configuration and motion that are the same as those of the first embodiment is omitted as appropriate. In FIG. 4, reference sign 10 denotes a hall destination call registering device that is installed in a hall and is capable of registering a service floor. Reference sign 2 denotes a group supervisory control device for an elevator, which controls a plurality of elevators, the group supervisory control device having the means described below. Reference sign 3 denotes an elevator control device for controlling cars.

The group supervisory control device 2 for an elevator is composed of a hall destination call registration device 2E, a hall call assignment means 2B, a passenger number prediction means 2F, an operation prediction means 2C, and a door open time control means 2D. The hall destination call registration device 2E registers a hall destination call performed from the hall destination call registering device at each floor, and the passenger number prediction means 2F predicts the number of passengers in each running section from the registered hall destination call. Also, the hall call assignment means 2B selects and assigns the optimum car by the registered hall destination call and the predicted number of passengers, and the operation prediction means 2C predicts the amount of regenerative power or the amount of consumed power for the running of each car from the position of car, the onboard load of car, the predicted number of passengers, the hall destination call, and the like, and predicts regenerative operation or power running operation. Also, the operation prediction means 2C also predicts the time taken for the running in each running section of each car.

Further, the door open time control means 2D determines, based on the prediction result and for the car 4A arriving in response to a hall call or a car call, whether or not any other car whose amount of consumed/regenerative power is canceled each other by the amount of consumed/regenerative power of the car 4A within fixed time exists. Also, in the case where, for example, the car 4B that is determined that the amount of regenerative/consumed power is canceled each other by that of the car 4A has arrived at a certain hall or is running, from the result of the operation prediction means 2C, the door open time of the car 4A or the car 4B is determined so that the overlap of the running times of the car 4A and the car 4B is at the maximum, and the door open time of the car 4A or the car 4B is controlled.

Figure 5:
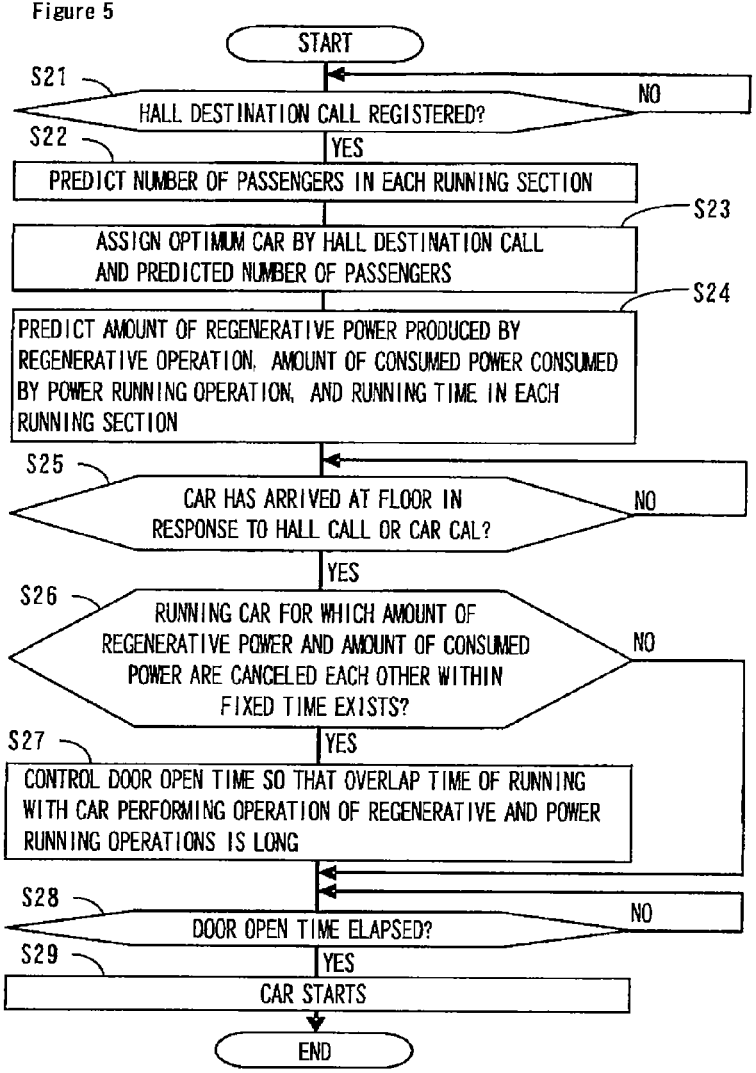
FIG. 5 is a flowchart showing motion of the group supervisory control device for an elevator in accordance with the second embodiment of the present invention.

Next, the motion of the group supervisory control device for an elevator in accordance with the second embodiment of the present invention is explained with reference to the flowchart of FIG. 5. First, in Step S21, based on the input of the hall destination call registering device 10, the hall destination call registration device 2E registers a hall destination call. Then, the hall call assignment means 2B determines whether or not the hall destination call has been registered. If it is determined that the hall destination call has been registered, the process proceeds to Step S22. If it is determined that the hall destination call has not been registered, the process returns to Step S21.

In Step S22, the passenger number prediction means 2F predicts the number of passengers in each running section from the hall destination call, and the process proceeds to Step S23. In Step S23, the hall call assignment means 2B assigns the optimum car, for example, the car 4A by the hall destination call and the predicted number of passengers. The predicted number of passengers is determined by the input of the hall destination call registering device 10 and the number of persons preset for each floor, and the load can be estimated from (the number of persons)×(the average body weight), the average body weight being set at, for example, 60 kilograms. Also, the preset number of persons can be set, for example, by using the result of statistics of each time slot for each floor.

Also, if a card reader or the like is used in place of the hall destination call registering device 10, the number of passengers can be predicted more exactly.

If the car 4A is assigned in Step S23, in Step S24, the operation prediction means 2C predicts the amounts of regenerative power and consumed power in each running section, predicts the regenerative operation or the power running operation, and predicts the time taken for running in each running section. For example, in the case where 6F, 9F, 10F and 15F are inputted in the hall destination call registering device 10, the operation prediction means 2C predicts the amounts of regenerative power and consumed power and the running time in the running section of from 6F to 9F, the amounts of regenerative power and consumed power and the running time in the running section of from 9F to 10F, and the amounts of regenerative power and consumed power and the running time in the running section of from 10F to 15F. The prediction of the amounts of regenerative power and consumed power and the running time is accomplished for all existing cars.

In Step S25, the hall call assignment means 2B determines whether or not the assigned car 4A has arrived at the floor in response to a hall call or a car call. If it is determined that the car 4A has arrived at the floor, the process proceeds to Step S26, and if it is determined that the car 4A has not arrived at the floor, the process returns to Step S25.

If it is determined in Step S25 that the car 4A has arrived at the floor in response to a hall call or a car call, in Step S26, referring to the information of running time of any other car (a plurality of cars and stopping cars are allowed if predicted already) whose regenerative/power running operation is reverse to that of the car 4A, which is stored by the operation prediction means 2C at the time point at which prediction is accomplished by the operation prediction means 2C, the door open time control means 2D determines whether or not a running car for which the amount of regenerative power and the amount of consumed power are canceled each other within fixed time exists among other cars. At this time, when any other car is stopping, the information of running time of any other car that is referred to is information of running time in each running section including the next running, and when any other car is running, the information of running time of any other car that is referred to is information of running time in each running section after the next but one running in addition to the present remaining time of running. If a car for which the amount of regenerative power and the amount of consumed power are canceled each other, for example, the car 4A exists, the process proceeds to Step S27. If such a car does not exist, the process proceeds to Step S28.

In Step S27, an arithmetic operation means (not shown) provided in the door open time control means 2D calculates the total overlap time between the running time in each running section of the car 4A having arrived at the hall and the running time of the car 4B determined to be a car whose regenerative/power running operation is reverse to that of the car 4A. The time that is the maximum overlap time among the times calculated by adding or subtracting a plurality of set numbers of seconds (for example, ±t1, ±t2, ±t3) to or from the standard door open time is calculated while being compared by the arithmetic operation means provided in the door open time control means 2D. Further, the door open time of the car 4A or the car 4B is controlled by the door open time obtained by adding the number of seconds determined to be the maximum overlap time by the calculation among the set numbers of seconds. At this time, when the number of seconds for which the maximum overlap time is obtained exists in plural numbers among the plurality of set numbers of second, the number of seconds in which the door open time from when the door has been opened fully to when the door begins to be closed is shorter may be adopted.

The calculation of the maximum overlap time is reviewed each time the car stops, and the door open time control means 2D controls the door open time at the present stopping time. Also, if it is assumed that the car stops plural times, all door open times at the times when the car stops are calculated as ordinary door open time without considering that the door open time is extended by the pushing of a button performed by a passenger.

For example, in the case where the car 4A has arrived at 5F in response to a hall call, and the car 4B has arrived at 6F in response to a hall call or a car call, it is predicted that the car 4A performs regenerative operation (the next running) for three seconds after two seconds and performs regenerative operation (the next but one running) for ten seconds after five seconds, and the car LIB performs power running operation (the next running) for five seconds after four seconds and performs power running operation (the next but one running) for six seconds after five seconds. In this case, since the overlap time of the next running of the cars 4A and 4B is one second, and the overlap time of the next but one running is five seconds, the total overlap time is six seconds. However, if control is carried out so that the door open time of the car 4A at 5F is extended by two seconds, since the overlap time of the next running of the cars 4A and 4B is three second, and the overlap time of the next but one running is six seconds, the total overlap time being nine seconds.

In the case where the car 4A has arrived at 5F in response to a hall call, and the car 4A has arrived at 6F in response to a hall call or a car call, assumption is made that it is predicted that the car 4A performs regenerative operation (the next running) for eight seconds after two seconds and performs regenerative operation (the next but one running) for five seconds after three seconds, and it is predicted that the car 4B performs power running operation (the next running) for three seconds after eight seconds and performs power running operation (the next but one running) for ten seconds after five seconds. In this case, if control is carried out so that the door open time of the car 4A at 5F is extended by six seconds and the door open times of the car 4A and the car 4B are made equal to each other, the overlap time of running is the maximum of eight seconds. However, the door open time of the car 4A at 5F may be extended by one second without carrying out the above-described control. Thus, the overlap time of running can be made the maximum of eight seconds by making the time for extending the door open time than usual at the minimum.

In Step S28, the door open time control means 2D determines whether or not the door open time has elapsed. If it is determined that the door open time has elapsed, the process proceeds to Step S29. In Step S29, upon the instruction of the door open time control means 2D, the elevator control device 3 causes the car to start, and the car runs until the next call.

In the above-described second embodiment, the hall destination call registering device is installed in the hall. However, if it is desired to register a hall call and a destination call, a card reader, a numerical key pad, or a fingerprint matching device may be used. By using one of these devices, the prediction of the number of passengers accomplished by the passenger number prediction means 2F is made more exact. Also, to increase the effect of control of door open time, the door close button in the elevator car may be made invalid temporarily.

Also, the configuration may be such that when the remaining running time of the car 4B is not shorter than the predetermined setting time, the arithmetic operation means provided in the door open time control means 2D calculates the overlap time between the running times of the car 4A and the car 4B. Thereby, the processing load of the door open time control means 2D can be reduced.

As described above, according to the second embodiment, in the case where the service floor can be grasped beforehand like a hall destination call, the amount of regenerative power produced by the regenerative operation or the amount of consumed power consumed by the power running operation and the running time in each running section can be predicted, so that even in the next but one running, the overlap of the running times of regenerative and power running operations can be considered. Therefore, in the total running sections, the overlap time of running with the car whose regenerative/power running operation is reverse can be prolonged, so that the regenerative power can be consumed more by the power running operation, and energy saving operation can be performed with high efficiency.

Also, since the regenerative power can be consumed more by the power of the power running operated car, a secondary battery for temporarily storing the regenerative power is not needed, or the capacity of the secondary battery can be decreased, which results in a reduction in the cost.

Third Embodiment

Explanation is given of a group supervisory control device for an elevator in accordance with a third embodiment of the present invention. The explanation of the configuration and motion that are the same as those of the first and second embodiments is omitted as appropriate.

Figure 6:
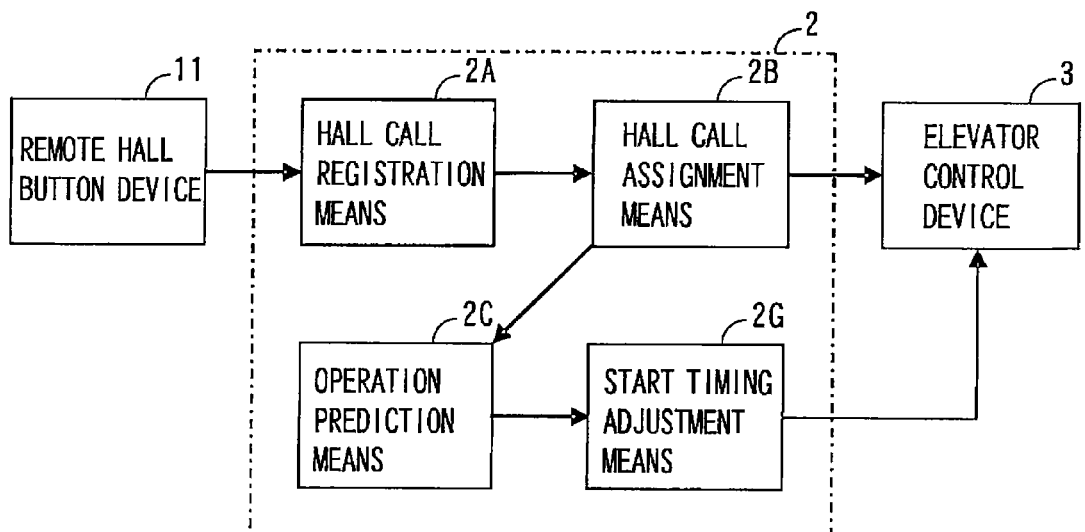
FIG. 6 is a block diagram showing a configuration of the group supervisory control device for an elevator in accordance with the third embodiment of the present invention.

FIG. 6 is a block diagram showing a configuration of the group supervisory control device for an elevator in accordance with the third embodiment of the present invention. The explanation of the configuration and motion that are the same as those of the first or second embodiment is omitted as appropriate. In FIG. 6, reference sign 11 denotes a remote hall button device installed at a place distant from the elevator hall. Reference sign 2 denotes a group supervisory control device for an elevator, which controls a plurality of elevators, the group supervisory control device having the means described below. Reference sign 3 denotes an elevator control device for controlling cars.

The group supervisory control device 2 for an elevator is composed of a hall call registration means 2A, a hall call assignment means 2B, an operation prediction means 2C, and a start timing adjustment means 2G. The hall call registration means 2A registers a hall call based on the input from a hall button device 1, and the hall call assignment means 2B determines whether or not the hall call has been registered, and assigns a hall call registered by the hall call registration means to the optimum car, for example, the car 4A. Also, the hall call assignment means 2B assigns the optimum car, for example, the car 4A based on the time for which the passenger arrives at the hall, which is determined from the distance from the remote hall button device 11 to the elevator hall and the walking speed of passenger. Also, the operation prediction means 2C predicts the amount of regenerative power or the amount of consumed power for the next running of the car 4A and all the other car from the position of car, the onboard load of car, the hall call, or the like, and predicts regenerative operation or power running operation. Also, the operation prediction means 2C predicts the running time for the next running of each car. Also, the start timing adjustment means 2G controls the start timing of car at predetermined timing based on the prediction result of the operation prediction means 2C.

Also, the start timing adjustment means 2G determines whether or not the time for which a passenger who depressed the remote hall button device 11 arrives at the hall is longer than the time for which the car 4A arrives at the hall in response to the hall call performed by the remote hall button device 11, and also the time obtained by adding fixed time to the time for which the passenger arrives at the hall is longer than the time for which the car 4A arrives at the hall. If the times are longer, the timing of start of the stopping car 4A is delayed within the time range in which the time for the passenger who depressed the remote hall button device 11 to wait is the fixed time. When, for example, the car 4B performing regenerative operation or power running operation reverse to the operation of the car 4A has arrived at a certain hall or is running, the timing of start of the car 4A is controlled so that the overlap of the running times of the car 4A and the car 4B is at the maximum. Inversely, if the times are not longer, the car 4A is caused to start immediately without delaying the timing of start, and is caused to arrive at the elevator hall at the timing earlier than the timing at which the passenger arrives at the elevator hall.

Figure 7:
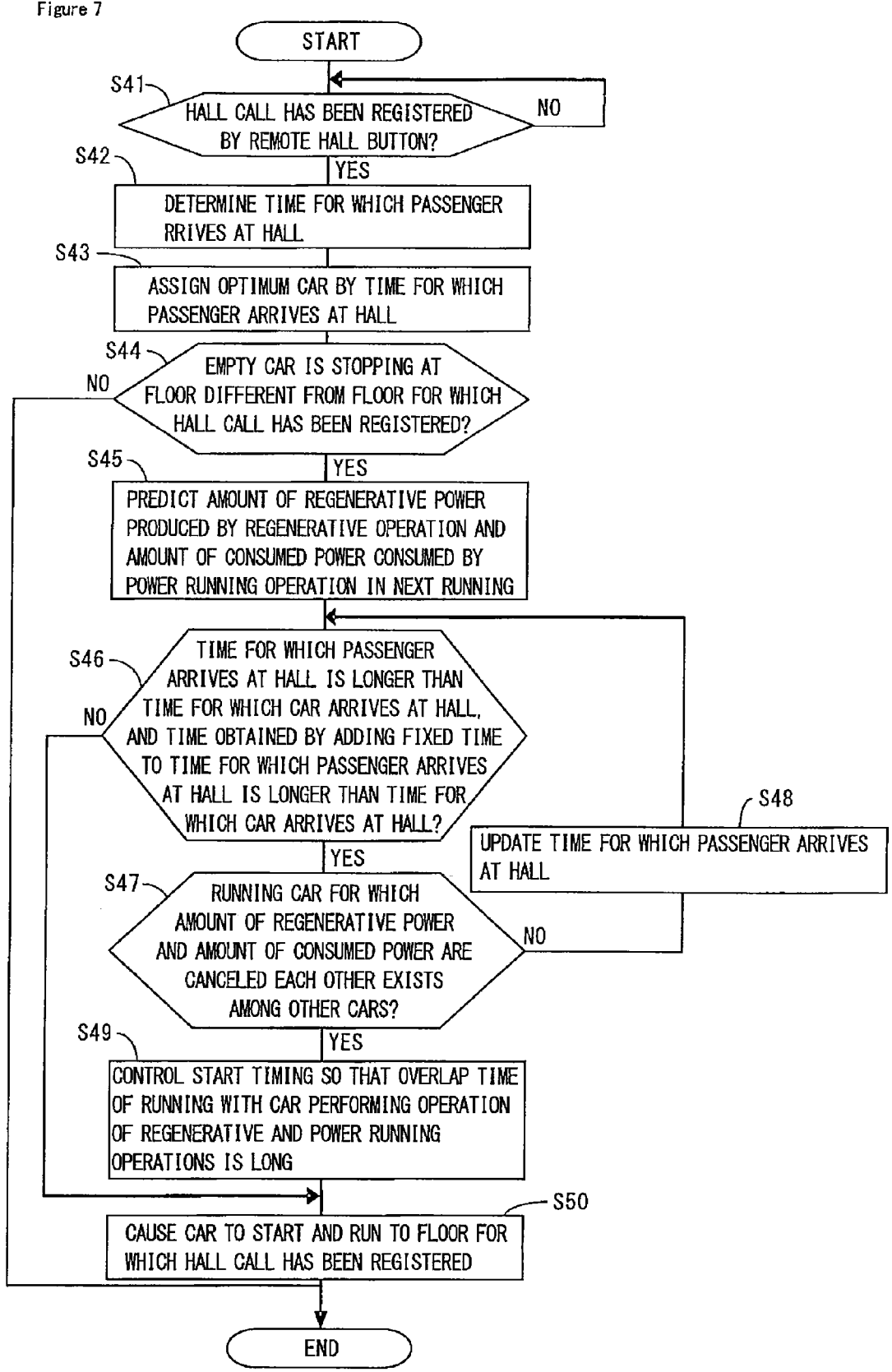
FIG. 7 is a flowchart showing motion of the group supervisory control device for an elevator in accordance with the third embodiment of the present invention.

Next, the motion of the group supervisory control device for an elevator in accordance with the third embodiment of the present invention is explained with reference to the flowchart of FIG. 7.

First, in Step S41, based on the input of the remote hall button device 11, the hall call registration means 2A registers a hall call. The hall call assignment means 2B determines whether or not the hall call has been registered, and if it is determined that the hall call has been registered, the process proceeds to Step S42. If it is determined that the hall call has not been registered, the process returns to Step S41.

In Step S42, the hall call assignment means 2B determines the time for which the passenger arrives at the hall from the distance between the remote hall button device 11 and the elevator hall and the walking speed of passenger.

In Step S43, by the time for which the passenger arrives at the hall, which is determined as described above, the hall call assignment means 2B selects and assigns the optimum car, for example, the car 4A, and the process proceeds to Step S44. The car having a hall call or a car call is not assigned.

If the assigned empty car 4A is stopping at a floor different from the floor for which a hall call has been registered by the remote hall button device 11 in Step S44, the process proceeds to Step S45. On the other hand, if the car 4A is not stopping at a floor different from the floor for which a hall call has been registered by the remote hall button device 11, the subsequent processing is not performed, and the processing is ended.

In Step S45, the operation prediction means 2C predicts the amount of regenerative power produced by the regenerative operation and the amount of consumed power consumed by the power running operation at the time when the predictable and assigned car 4A runs to the floor at which a hall call has been performed from the position of car, the load of car, and the position of the next call, and the process proceeds to Step S46. The prediction of the amount of regenerative power produced by the regenerative operation and the amount of consumed power consumed by the power running operation is accomplished for all of the cars. For example, the prediction is accomplished repeatedly during the time from when the passenger gets in the car to when the door begins to be closed, and the prediction may be accomplished at the time when a car call arrives, the time when a hall call arrives, or the time when the door begins to be closed, or may be accomplished always during the time when the car is stopping.

In Step S46, the start timing adjustment means 2G determines whether or not the time for which a passenger who depressed the remote hall button device 11 arrives at the hall is longer than the time for which the car 4A arrives at the hall in response to the hall call performed by the remote hall button device 11, and also the time obtained by adding fixed time to the time for which the passenger arrives at the hall is longer than the time for which the car arrives at the hall. If it is determined that the times are longer, the process proceeds to Step S47. At this time, the fixed time is the time for which the passenger can permit waiting for energy saving, for example, being made fifteen seconds. Also, if it is determined that the times are not longer, the process proceeds to Step S50.

In Step S47, referring to the information of running time of any other car (a plurality of cars and stopping cars are allowed if predicted already) whose regenerative/power running operation is reverse to that of the car 4A, which is stored by the operation prediction means 2C at the time point at which prediction is accomplished by the operation prediction means 2C, the start timing adjustment means 2G determines whether or not a running car for which the amount of regenerative power and the amount of consumed power are canceled each other within fixed time exists among other cars. At this time, when other cars are stopping, the information of running time of any other car that is referred to is information of running time in each running section including the next running. Even when three or more canceling running cars exist, it is determined whether or not the total amount of regenerative power and the total amount of consumed power are canceled each other. If a car for which the amount of regenerative power and the amount of consumed power are canceled each other, for example, the car 4B exists, the process proceeds to Step S49. If such a car does not exist, the process proceeds to Step S48.

In Step S48, the hall call assignment means 2B updates the time until the passenger who depressed the remote hall button device 11 arrives at the elevator hall, and the process returns to Step S46. On the other hand, in order for the process to proceed to Step S49, the conditions of Step S46 and Step S47 must be satisfied. That is, the operation prediction means 2C accomplishes prediction so as to check whether or not any other car performing regenerative operation or power running operation reverse to the operation of the assigned car 4A exists within the time of (time for which the passenger who depressed the remote hall button device 11 arrives at the hall+fixed time)−(time for which the car 4A arrives at the hall).

Also, if it is determined in Step S47 that any other car 4B performing regenerative operation or power running operation reverse to the operation of the assigned car 4A exists, in Step S49, an arithmetic operation means (not shown) provided in the start timing adjustment means 2G calculates the overlap time between the next running time of the car 4A arriving at the hall and the running time (during the running, representing the remaining time of running time) of the car 4B that is determined to be a car performing regenerative operation or power running operation reverse to the operation of the car 4A. The time that is the maximum overlap time among the times calculated by adding a plurality of set numbers of seconds (for example, t1, t2, t3) to the time elapsing from the present time point to the time when the car starts is calculated while being compared by the arithmetic operation means provided in the start timing adjustment means 2G. Further, the timing of starting of the car 4A is controlled by the number of seconds that is determined to be the maximum overlap time by the calculation among the set numbers of seconds, and the process proceeds to Step S50. The configuration may be such that when the remaining running time of the car 4B is not shorter than the predetermined setting time, the arithmetic operation means provided in the start timing adjustment means 2G calculates the overlap time between the running times of the car 4A and the car 4B. Thereby, the processing load of the door open time control means 2D can be reduced.

In the following, the method for controlling the start timing in Step S49 is explained by taking a specific example. For example, in the case where the car 4A has stopped at the hall of 3F, and the car 4B has arrived at 4F in response to a hall call or a car call, when it is predicted that the car 4A performs regenerative operation for six seconds after one second, and the car 4B performs power running operation for ten seconds after five seconds, the overlap time between running times is two seconds. However, if control is carried out so that the timing of start of the car 4A is delayed by four seconds, the overlap time of running becomes six seconds.

In the case where the car 4A has arrived at 3F in response to a hall call, and the car 4B has arrived at 4F in response to a hall call or a car call, and where the operation prediction means 2C predicts that the car 4A performs regenerative operation for ten seconds after one second, and the car 4B performs power running operation for seven seconds after five seconds, control for delaying the timing of start of the car 4A by one second may be carried out without carrying out the control such that the timing of start of the car 4A is delayed by four seconds and is made equal to the timing of start of the car 4B. By carrying out such control, the time for which the start timing is delayed is made at the minimum, and the maximum overlap time of running of seven seconds can be obtained.

Also, when the car 4B is running, to make the overlap time between the running times of the car 4A and the car 4B at the maximum, the start timing control means 2G controls the start timing of the car 4A so that the car 4A that is stopping at a floor different from the floor for which a hall call has been registered by the remote hall button device 11 is started immediately.

Also, the case where three or more cars that cancel the amounts of regenerative power and consumed power each other exist is also thought. For example, the case is such that the car 4A has stopped at the hall of 5F, the car 4B has arrived at 9F and a car 4C has arrived at 3F in response to a hall call or a car call, and it is assumed that the operation prediction means 2C predicts that the car 4A performs regenerative operation for ten seconds after two seconds, the car 4B performs power running operation for five seconds after five seconds, and the car 4C performs power running operation for eight seconds after eight seconds. In this case, the overlap time between the running times of the regenerative operation and the power running operation is seven seconds. However, by delaying the start timing of the car 4A by three seconds and matching it with the start timing of the car 4B, the overlap time between the regenerative operation and the power running operation can be made the maximum of ten seconds.

In Step S50, upon the instruction of the start timing adjustment means 2G, the elevator control device 3 causes the car to start and run to the floor for which a hall call has been registered by the remote hall button device 11. As a result, when any other car 4B has arrived in response to a certain hall call or car call in Step S49, the car 4B arrives at the elevator hall at the timing earlier than the arrival of passenger according to the time when the car 4A starts.

Also, when any other car 4B is running in Step S49, the car 4B arrives at the elevator hall at the timing earlier than the timing at which the passenger arrives at the elevator hall.

On the other hand, if the answer is NO in Step S46, the car 4A arrives at the elevator hall at almost the same timing as the timing at which the passenger who depressed the remote hall button device 11 arrives at the hall.

As described above, according to the third embodiment, by utilizing the walking time from the remote hall button to the elevator hall, the start timing is controlled so that during the time when the assigned car that is stopping at a floor different from the floor for which a hall call has been registered by the remote hall button device 11 runs to the floor for which a hall call has been registered by the remote hall button device 11, the overlap time of running with the car performing regenerative operation or power running operation reverse to the operation of the assigned car becomes long. Therefore, energy saving operation can be performed without deterioration in the conveying capacity of elevator.

DESCRIPTION OF SYMBOLS 1 hall button device
2 group supervisory control device for elevator
2A hall call registration means
2B hall call assignment means
2C operation prediction means
2D door open time control means
2E hall destination call registration means
2F passenger number prediction means
2G start timing adjustment means
3 elevator control device
4A, 4B car
5 traction machine
6 counterweight
7 inverter
8 converter
9 commercial power source
10 hall destination call registering device
11 remote hall button device

The invention claimed is:

1. A group supervisory control device for an elevator, by which elevator control devices for controlling a plurality of cars are controlled as one group, comprising:
a hall call assignment portion by which a specific car is assigned to a hall call registered by hall call registration portion for registering a hall call at each floor;
an operation prediction portion by which, when the specific car has stopped at a responding hall, it is predicted which is the operation to the next hall registered by the hall call registration portion according to the car traveling direction and the car load, regenerative operation which regenerates power or power running operation which consumes power, and the time for which the regenerating operation or the power running operation is performed is predicted; and
a door open time control portion by which the time for which the regenerative operation or the power running operation of the specific car is performed, which is predicted by the operation prediction portion, is compared with the remaining running time of any other car performing the power running operation or the regenerative operation already predicted by the operation prediction portion, overlap time for which the specific car and the any other car perform the regenerative operation and the power running operation simultaneously is calculated, and
door open time set for the specific car, which is used for the calculation, is changed and the overlap time is calculated to determine the door open time which can obtain longer overlap time, whereby a door is closed.

2. A group supervisory control device for an elevator, by which elevator control devices for controlling a plurality of cars are controlled as one group, comprising:
a hall call assignment portion by which a specific car is assigned to a hall destination call registered by hall destination call registration portion for registering a hall destination call at each floor;
an operation prediction portion by which it is predicted which is the operation in each running section of a hall registered by the hall destination call registration portion according to the car travel direction and the estimated onboard load, regenerative operation which regenerates power or power running operation which consumes power, and the time for which the regenerating operation or the power running operation is performed is predicted; and
a door open time control portion by which the time for which the regenerative operation or the power running operation of the specific car is performed, which is predicted by the operation prediction portion, is compared with the remaining running time in each running section of any other car performing the power running operation or the regenerative operation already predicted by the operation prediction portion, overlap time for which the specific car and the any other car perform the regenerative operation and the power running operation simultaneously is calculated, and
door open time set for the specific car, which is used for the calculation, is changed and the overlap time is calculated to determine the door open time which can obtain longer overlap time, whereby a door is closed.

3. A group supervisory control device for an elevator, by which elevator control devices for controlling a plurality of cars are controlled as one group, comprising:
a remote hall button installed at a place distant from an elevator hall;
a remote hall call assignment portion by which considering walking time to the elevator hall, a specific car is assigned to a hall call performed by the remote hall button, which hall call has been registered by hall call registration portion for registering a hall call at each floor;
an operation prediction portion by which it is predicted which is the operation to the hall at which the hall call has been performed according to the car traveling direction and the car load, regenerative operation which regenerates power or power running operation which consumes power, and the time for which the regenerating operation or the power running operation is performed is predicted; and
a start timing control portion by which when it is determined that the time for which a passenger who depressed the remote hall button arrives at the elevator hall is longer than the time necessary for the specific car which is stopping at a certain place and is assigned by the hall call assignment portion to respond to the hall call, and also the time obtained by adding fixed time to the time for which the passenger arrives at the elevator hall is longer than the time for which the specific car arrives at the elevator hall,
the time for which the regenerative operation or the power running operation of the specific car predicted by the operation prediction portion is performed is compared with the remaining running time of any other car performing the power running operation or the regenerative operation already predicted by the operation prediction portion, overlap time for which the specific car and the any other car perform the regenerative operation and the power running operation simultaneously is calculated, and door open time set for the specific car, which is used for the calculation, is changed and the overlap time is calculated to determine the start timing which can obtain longer overlap time, whereby the car is started.

4. The group supervisory control device for an elevator according to claim 1, wherein when the remaining running time of the any other car is not shorter than the predetermined setting time, an arithmetic operation portion provided in the door open time control portion calculates the overlap time.

5. The group supervisory control device for an elevator according to claim 2, wherein when the remaining running time of the any other car is not shorter than the predetermined setting time, an arithmetic operation portion provided in the door open time control portion calculates the overlap time.

6. The group supervisory control device for an elevator according to claim 3, wherein when the remaining running time of the any other car is not shorter than the predetermined setting time, an arithmetic operation portion provided in the start timing control portion calculates the overlap time.

* * * * *